Sept. 14, 1926. 1,599,473
K. O. WINELL
SIDE BEARING
Filed Jan. 22, 1925 2 Sheets-Sheet 1

Witnesses
Colman F. Zaitz
Kathleen Kleber

Inventor
Karl. O. Winell
By
G. O. Laube
Attorney

Sept. 14, 1926.  K. O. WINELL  1,599,473
SIDE BEARING
Filed Jan. 22, 1925   2 Sheets-Sheet 2

Patented Sept. 14, 1926.

1,599,473

UNITED STATES PATENT OFFICE.

KARL O. WINELL, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

SIDE BEARING.

Application filed January 22, 1925. Serial No. 4,033.

This invention relates to transportation cars and particularly to railway cars of the articulated unit type in which each unit comprises a plurality of car bodies, the adjacent ends of two of which are carried by a single truck, and has for an object the provision of side supports or bearings between the truck and the adjacent ends of two of the bodies of a car unit.

Another object of the invention is to provide a side bearing for articulated cars which comprises a resilient member adapted to engage the car truck and adjacent ends of two of the bodies of a car unit.

Another object of the invention is to provide a side bearing for an articulated car comprising a resilient member mounted on a truck and loosely engaging the adjacent ends of two of the bodies of the car.

A further object of the invention is to provide a side bearing for an articulated car which comprises a member extending between and at its ends engaging the adjacent ends of two bodies of the car and between its ends engaging an adjacent car truck.

Figure 1:
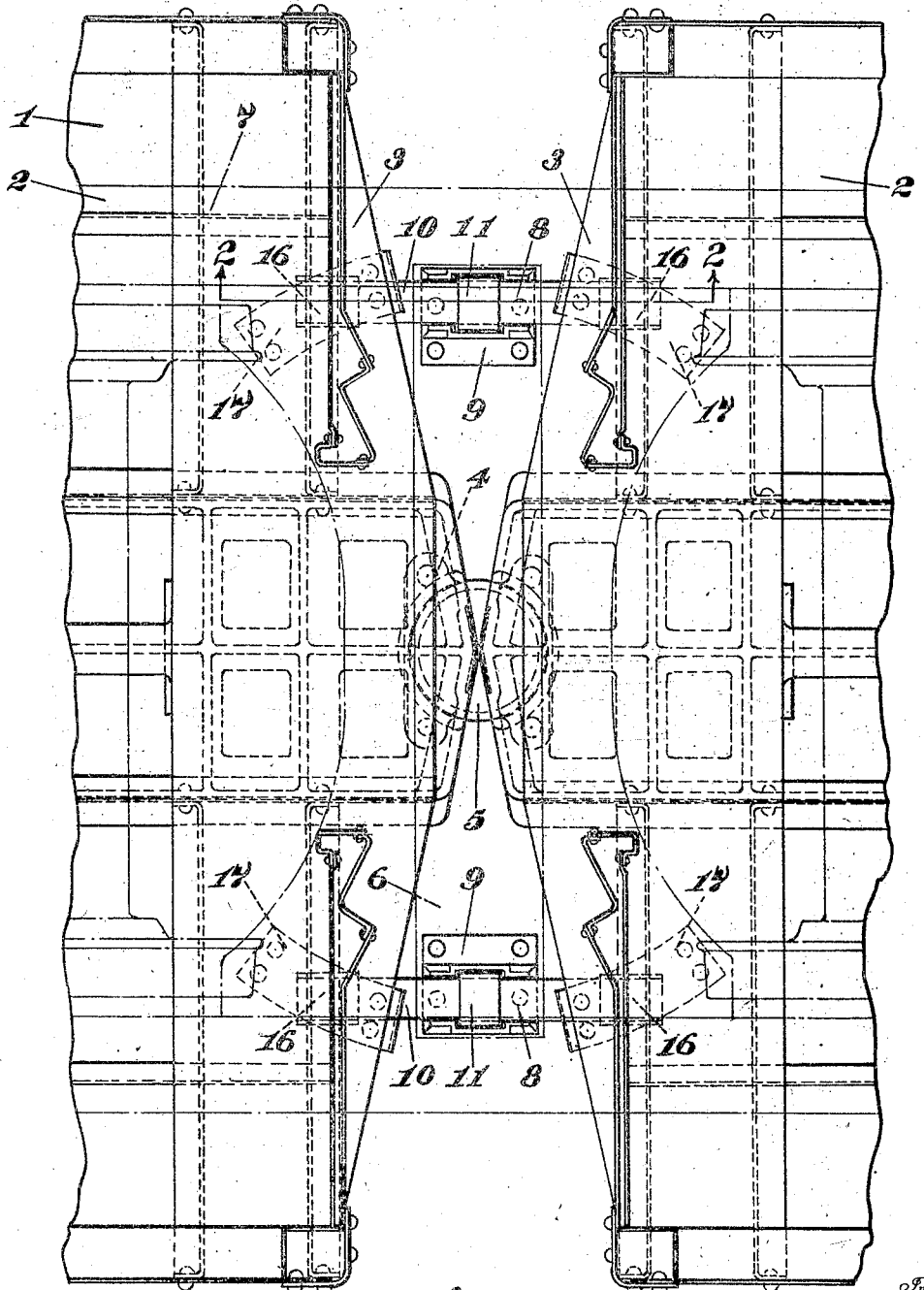
Figure 2:
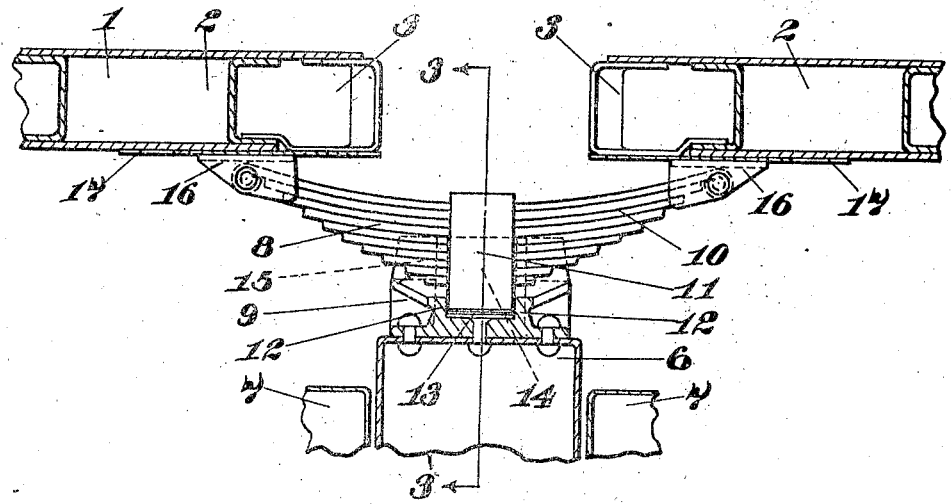
Figure 4:
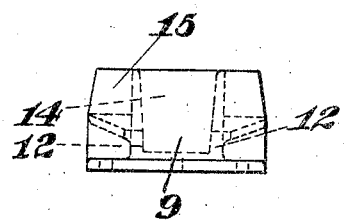
Figure 5:
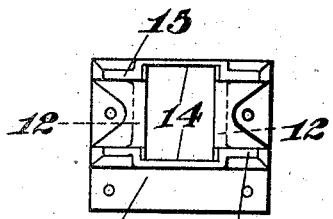
Figure 3:
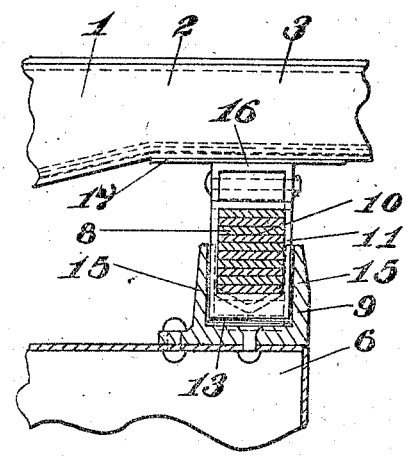

Referring to the drawings in which like reference characters refer to like parts, Fig. 1 is a plan view of portions of the adjacent ends of two car bodies of the articulated car unit; Fig. 2 is an enlarged longitudinal sectional view of the same, taken on the line 2—2 of Fig 1; Fig. 3 is a cross sectional view of the same, taken on the line 3—3 of Fig. 2; Fig. 4 is an enlarged detail side elevational view of the side bearing base and Fig. 5 is a plan view of the same.

Referring now in detail to the drawings the reference character 1 indicates an articulated car unit which comprises a plurality of car bodies 2, the adjacent end portions 3 of two of which have been shown in the drawings. These ends 3 are provided with body center plates 4 both of which engage a truck center plate 5 mounted on a truck bolster 6 which bolster is a part of a truck 7. The center plates 4 and 5 are so formed that they engage with each other in such a manner as to permit the bodies 3 of the unit to move freely relative to each other and to the truck as the unit rounds a curve or when the bodies sway from side to side. On each side of the longitudinal center line of the bodies 2 a side bearing member 8 is provided which intermediate its ends is seated in a support or base 9 secured to the truck bolster 6.

The side bearing members 8 extend between the adjacent ends of adjacent bodies and each preferably comprises a spring made up of a plurality of spring plates 10 of varying lengths which are securely held together, one on top of the other, through the medium of a spring band 11. The lower portion of this spring band extends between spaced, upwardly extending lugs 12 formed in the base 9, and below the upper edges of such lugs, this band rests on shims 13 arranged between the lugs. It will be understood that in some cases these shims may be omitted and the lower portion of the spring band may rest directly upon the base 9 between the lugs. The sides of the spring bands extend into channels 14 which are formed in upwardly projecting lugs 15 of the base 9, which channels are preferably of varying width having their greatest widths adjacent their upper edges. It will be noted that when the side bearing member is mounted in the base 9 it will be permitted to cant or rock slightly in the direction of its length and yet will not become accidentally separated from the base 9.

Each of the side bearing members 8 is of sufficient length to pass across the bolster and across the space between the ends 3 of adjacent car bodies and at each end is provided with a shoe member 16 which is pivotally connected with the uppermost spring plate 10 and its upper surface is adapted to be engaged by a side bearing plate or member 17 secured to the underframe of one of the car bodies.

It will be noted that, as the side bearing members 8 are resilient, and loosely mounted on the truck, and that the shoe members 16 are pivotally mounted on the members 8, a proper bearing between the car body and the truck is insured at all times and under all service conditions.

It will be apparent to those skilled in the art to which this invention appertains that changes may be made in the details of the invention without departing from the spirit and scope of the appended claims.

Having thus described the invention, what I claim as new and desire to secure by Letters Patent is:—

1. In a railway car comprising a plurality of car bodies, a truck pivotally connected with the adjacent ends of said bodies, a side bearing member adjustably mounted on said truck, adapted to extend between and be engaged by the adjacent ends of said bodies.

2. In a side bearing for the adjacent ends of a plurality of car bodies of an articulated railway car unit, comprising a resilient member adapted to be engaged by the end portions of two adjacent car bodies.

3. In an articulated car unit, comprising a plurality of car bodies, a truck pivotally connecting said bodies and a resilient member mounted on said truck adapted to be engaged by the adjacent ends of said bodies, said member being adapted to rock relative to said truck.

4. In an articulated car unit, comprising a plurality of car bodies, a truck connecting the adjacent ends of said bodies, and an adjustable side bearing extending between said ends.

5. In an articulated car comprising a plurality of car bodies, a truck for supporting the adjacent ends of two of said bodies, and a side bearing between said bodies and truck, said side bearing comprising a single resilient member.

6. In an articulated car comprising a plurality of car bodies, a truck for supporting the adjacent ends of two of said bodies, a resilient side bearing loosely mounted between said truck and bodies and bearing shoes on the ends of said side bearing.

7. In an articulated car comprising a plurality of car bodies, a truck for supporting the adjacent ends of two of said bodies, a resilient side bearing member loosely mounted on said truck, and shoe members pivotally mounted adjacent the ends of said member adapted to engage said bodies.

8. In an articulated car comprising a plurality of car bodies, a truck for supporting the adjacent ends of two of said bodies, a bolster, a side bearing member loosely mounted on said bolster and extending on each side thereof, and shoe members mounted on the end portions of said member adapted to be engaged by said bodies.

9. In a side bearing for two bodies of an articulated car comprising a leaf spring and shoe members mounted on the ends thereof adapted to be engaged by the adjacent ends of said bodies.

10. In an articulated car comprising a plurality of car bodies, a truck supporting the adjacent ends of two of said bodies, a truck bolster, a resilient side bearing member mounted on said bolster and extending thereacross, and a shoe member on each end of said member adapted to engage with one of said bodies.

11. In a side bearing for articulated cars, a base portion, a resilient member mounted in said base portion and tiltable in the direction of its length.

12. In an articulated car comprising a plurality of car bodies, a truck supporting the adjacent ends of two of said bodies, and leaf spring side bearing means interposed between and engaging said bodies and truck.

13. In an articulated car comprising a plurality of car bodies, a truck, and a side bearing on said truck adapted to be engaged by two of said bodies, said side bearing comprising a single resilient member.

14. In an articulated car comprising a plurality of car bodies, a truck supporting the adjacent ends of two of said bodies, a side bearing on said truck comprising a member which extends across the space between said ends and shoe members on the ends of said member adapted to engage with said bodies.

15. In an articulated car comprising a plurality of car bodies, a truck supporting the adjacent ends of two of said bodies, and a side bearing on said truck, said side bearing comprising a single member extending between and adapted to be engaged by both of said bodies.

16. In an articulated car comprising a plurality of car bodies, a truck supporting the adjacent ends of two of said bodies, a side bearing having its central portion mounted on said truck and its ends extended upwardly into engagement with said ends.

17. In an articulated car comprising a plurality of car bodies, a truck, a side bearing having its central portion adjustably mounted on said truck and its end portions engaging the adjacent end portions of two of said bodies.

18. In an articulated car comprising a plurality of car bodies, a truck, and a resilient side bearing loosely mounted at its central portion on said truck and at its ends being adapted to engage with the end portions of two adjacent car bodies.

In testimony whereof, I affix my signature.

KARL O. WINELL.